United States Patent
Liu et al.

(10) Patent No.: US 10,020,663 B2
(45) Date of Patent: Jul. 10, 2018

(54) CIRCUIT PROTECTION METHOD AND APPARATUS, CHARGING DEVICE AND COMPUTER STORAGE MEDIUM

(71) Applicant: ZTE Corporation, Shenzhen, Guangdong (CN)

(72) Inventors: Chen Liu, Shenzhen (CN); Chuan He, Shenzhen (CN); Jianping Zhou, Shenzhen (CN); Yong Luo, Shenzhen (CN); Jie Fan, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 96 days.

(21) Appl. No.: 15/024,913

(22) PCT Filed: Jun. 17, 2014

(86) PCT No.: PCT/CN2014/080115
§ 371 (c)(1),
(2) Date: Mar. 25, 2016

(87) PCT Pub. No.: WO2015/043241
PCT Pub. Date: Apr. 2, 2015

(65) Prior Publication Data
US 2016/0218532 A1    Jul. 28, 2016

(30) Foreign Application Priority Data

Sep. 27, 2013  (CN) .......................... 2013 1 0452456

(51) Int. Cl.
*H02J 7/00* (2006.01)
*H02J 50/10* (2016.01)

(52) U.S. Cl.
CPC .......... *H02J 7/0029* (2013.01); *H02J 7/0052* (2013.01); *H02J 50/10* (2016.02); *H02J 2007/0037* (2013.01); *H02J 2007/0059* (2013.01)

(58) Field of Classification Search
CPC .................. H02J 7/0029; H02J 7/0052; H02J 2007/0037; H02J 2007/0059
(Continued)

(56) References Cited

U.S. PATENT DOCUMENTS 4,255,789 A * 3/1981 Hartford et al. ...... F02D 41/263
                                                      123/406.65
6,879,133 B1    4/2005 Geren
(Continued)

FOREIGN PATENT DOCUMENTS

CN    101179200 A    5/2008
CN    101222146 A    7/2008
(Continued)

OTHER PUBLICATIONS

International Search Report in international application No. PCT/CN2014/080115, dated Aug. 29, 2014, 6 pgs.
(Continued)

*Primary Examiner* — Sun Lin
(74) *Attorney, Agent, or Firm* — Cooper Legal Group, LLC

(57) ABSTRACT

The present disclosure discloses a circuit protection method. The method includes that: a voltage or a current sent by a sending end of a circuit protection apparatus is received, and a voltage value of the received voltage or a current value of the received current is sampled; when it is detected that the sampled voltage value or current value is in a first pre-set threshold range, a pre-set input control switch is controlled to be turned on, and an input of a voltage or a current of the
(Continued)

sending end is received; the received voltage or the received current is converted and processed, and a voltage value of the processed received voltage or a current value of the processed received current is sampled; and when it is detected that the processed voltage value or the processed current value is in a second pre-set threshold range, a pre-set output control switch is controlled to be turned on, and the processed received voltage or the processed received current is allowed to be outputted. The present disclosure also discloses a circuit protection apparatus, a charging device and a computer storage medium.

16 Claims, 3 Drawing Sheets

(58) Field of Classification Search
USPC .......................................................... 320/162
See application file for complete search history.

(56) References Cited

U.S. PATENT DOCUMENTS

| | | | |
|---|---|---|---|
| 7,602,146 B2 | 10/2009 | Carrier | |
| 7,701,176 B2* | 4/2010 | Chen .................... | H02J 7/0031 |
| | | | 320/134 |
| 8,129,948 B2* | 3/2012 | Chen .................... | H02J 7/0031 |
| | | | 320/134 |
| 8,880,913 B2* | 11/2014 | Holsen et al. .......... | G06F 1/263 |
| | | | 361/1 |
| 8,943,335 B2* | 1/2015 | Holsen et al. .......... | G06F 1/263 |
| | | | 320/132 |
| 2005/0242778 A1 | 11/2005 | Lin | |
| 2012/0293009 A1 | 11/2012 | Kim | |

FOREIGN PATENT DOCUMENTS

| | | |
|---|---|---|
| CN | 201113411 Y | 9/2008 |
| CN | 101803140 A | 8/2010 |
| CN | 102255342 A | 11/2011 |
| CN | 102655245 A | 9/2012 |
| CN | 202737561 U | 2/2013 |
| CN | 202737569 U | 2/2013 |
| CN | 203218872 U | 9/2013 |
| EP | 0156656 A1 | 10/1985 |
| WO | 2013015207 A1 | 1/2013 |

OTHER PUBLICATIONS

English Translation of the Written Opinion of the International Search Authority in international application No. PCT/CN2014/080115, dated Aug. 29, 2014, 13 pgs.

Supplementary European Search Report in European application No. 14847316.8, dated Aug. 30, 2016, 55 pgs.

* cited by examiner

CIRCUIT PROTECTION METHOD AND APPARATUS, CHARGING DEVICE AND COMPUTER STORAGE MEDIUM

TECHNICAL FIELD

The present disclosure relates to a wireless charging technology, and in particular to a circuit protection method and apparatus, a charging device and a computer storage medium in a wireless charging process.

BACKGROUND

With the rapid development of industry, electric vehicles and electric bicycles have come into the lives of people. Compared with fuel vehicles, the electric vehicles and the electric bicycles fully utilize electric energy resources, thereby greatly reducing the environmental pollution.

Currently, wireless charging of the electric vehicles and the electric bicycles becomes a hot research subject.

The wireless charging technology refers to that by using an electromagnetic wave induction principle, an electromagnetic wave signal sending end (electric energy sending end) and an electromagnetic wave signal receiving end (electric energy receiving end) are each internally provided with an electromagnetic wave transmitting and receiving apparatus such as a coil, the sending end connected to a wired power supply generates an electromagnetic signal by using the corresponding coil, the coil at the receiving end induces the electromagnetic signal generated by the sending end so as to generate a current and a voltage, and a battery is charged.

In practical application, the electric energy sending end for wirelessly charging the electric vehicles and the electric bicycles is an electric power system such as a mains supply; and a charging device for the electric vehicles and the electric bicycles, serving as the electric energy receiving end, receives electric energy from the sending end, performs a series of processing such as rectification, voltage dividing/current dividing, and alternating current-direct current conversion, and inputs the processed voltage or current into the battery so as to charge the battery. If the voltage or the current received by the battery is over-large, the battery is likely to be damaged, and some hidden troubles may be brought to charging safety.

SUMMARY

The embodiments of the present disclosure are intended to provide a circuit protection method and apparatus, a charging device and a computer storage medium, which can automatically detect faults occurring in a wireless charging process, reduce the damage probability of a battery and improve the safety of wireless charging.

The technical solutions of the embodiments of the present disclosure are implemented as follows.

An embodiment of the present disclosure provides a circuit protection method, which may include:

a voltage or a current sent by a sending end is received, and a received voltage value or current value is sampled;

when it is detected that the sampled voltage value or current value is in a first pre-set threshold range, a pre-set input control switch is controlled to be turned on, and the input of a voltage or a current of the sending end is received;

the received voltage or current is converted, and a voltage value of the processed voltage or a current value of the processed current is sampled; and when it is detected that the processed voltage value or current value is in a second pre-set threshold range, a pre-set output control switch is controlled to be turned on, and the processed voltage or current is allowed to be outputted.

In the solution, the method may further include:

when it is detected that the sampled voltage value or current value is out of the first threshold range, the input control switch is controlled to be turned off, the input of the voltage or the current of the sending end is stopped, and a notification message is sent to the sending end.

In the solution, during the processing of the received voltage or current, the method may further include that:

the received voltage or current is subjected to rectification, voltage dividing/current dividing, and alternating current-direct current conversion.

In the solution, the method may further include that:

when it is detected that the processed voltage value or current value is out of the second threshold range, the output control switch is controlled to be turned off, and the output of the processed voltage or current is prohibited.

The present disclosure also provides a circuit protection apparatus, which may include: a sampling unit, a first detection unit, a control unit, a conversion unit and a second detection unit, wherein the sampling unit is configured to sample a voltage value or a current value sent by a sending end;

the first detection unit is configured to trigger the control unit when it is detected that the voltage value or the current value is in a first pre-set threshold range;

the control unit is configured to control a pre-set input control switch to be turned on to enable a voltage or a current of the sending end to be inputted;

the conversion unit is configured to convert the received voltage or current;

the sampling unit is configured to sample a voltage value of the processed voltage or a current value of the processed current;

the second detection unit is configured to trigger the control unit when it is detected that the processed voltage value or current value is in a second pre-set threshold range; and the control unit is configured to control a pre-set output control switch to be turned on, and allow the processed voltage or current to be outputted.

In the solution, the first detection unit may be further configured to trigger the control unit when it is detected that the voltage value or the current value is out of the first threshold range; and the control unit may be configured to control the input control switch to be turned off, stop the input of the voltage or the current of the sending end, and send a notification message to the sending end.

In the solution, the apparatus may further include: a conversion unit, configured to perform rectification, voltage dividing/current dividing, and alternating current-direct current conversion on the received voltage or current.

In the solution, the second detection unit may be further configured to trigger the control unit when it is detected that the processed voltage value or current value is out of the second threshold range; and the control unit may be further configured to control the output control switch to be turned off, and prohibit the output of the processed voltage or current.

An embodiment of the present disclosure also provides a charging device, which may include the circuit protection apparatus.

An embodiment of the present disclosure also provides a computer storage medium, and computer executable instructions may be stored in the computer storage medium and may be configured to execute the circuit protection apparatus.

The embodiments of the present disclosure provide the circuit protection method and apparatus, the charging device and the computer storage medium. The method includes: the voltage or the current sent by the sending end is received, and the received voltage value or current value is sampled; when it is detected that the sampled voltage value or current value is in the first pre-set threshold range, the pre-set input control switch is controlled to be turned on, and the input of the voltage or the current of the sending end is received; the received voltage or current is converted, and the voltage value of the processed voltage or the current value of the processed current is sampled; and when it is detected that the processed voltage value or current value is in the second pre-set threshold range, the pre-set output control switch is controlled to be turned on, and the processed voltage or current is allowed to be outputted. By means of the technical solutions of the embodiments of the present disclosure, the detection of an illegal voltage value or current value can be realized, so that the illegal voltage value or current value cannot be inputted to a battery side. Thus, the damage probability of the battery is reduced, and the safety of wireless charging is improved.

DETAILED DESCRIPTION

In the subsequent technical solutions of the embodiments of the present disclosure, the detection of the illegal voltage value or current value can be realized, so that the illegal voltage value or current value cannot be inputted to the battery side. Meanwhile, the electric energy sending end can be informed of the problems of over-large charging voltage/current and the like occurring at the electric energy receiving end in time, and an effective way is provided for removing hidden charging troubles.

Figure 1:
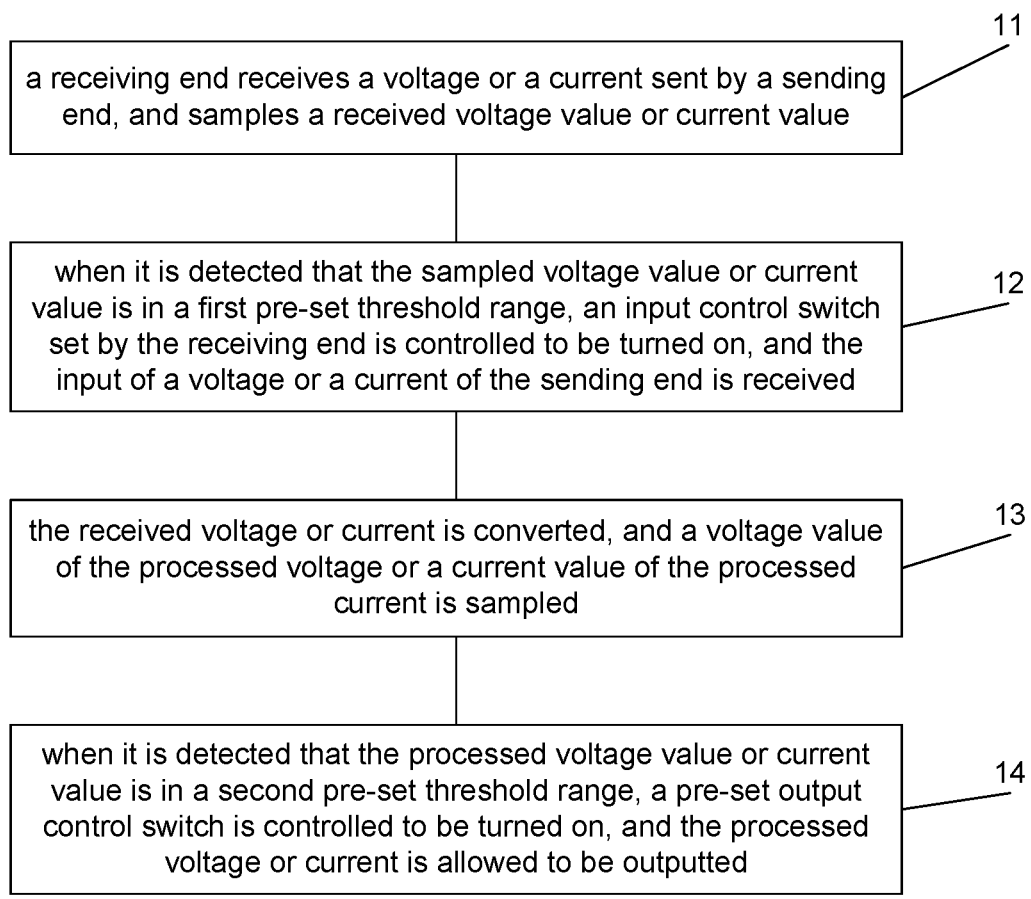
FIG. 1 is a flowchart of a circuit protection method according to an embodiment of the present disclosure.

As shown in FIG. 1, an embodiment of the present disclosure provides a circuit protection method, which includes:

Step 11: an electric energy receiving end (receiving end for short) receives a voltage or a current sent by an electric energy sending end (sending end for short), and samples a received voltage value or current value;

Step 12: when it is detected that the sampled voltage value or current value is in a first pre-set threshold range, an input control switch set by the receiving end is controlled to be turned on, and the input of a voltage or a current of the sending end is received;

Step 13: the received voltage or current is converted, and a voltage value of the processed voltage or a current value of the processed current is sampled; and Step 14: when it is detected that the processed voltage value or current value is in a second pre-set threshold range, a pre-set output control switch is controlled to be turned on, and the processed voltage or current is allowed to be outputted.

The sending end and the receiving end involved in the embodiment of the present disclosure are each internally provided with a wireless transmitting and receiving apparatus, not only are applied to the electric vehicles and the electric bicycles, but also can be applied to the wireless charging process of a terminal.

When it is detected that the sampled voltage value or current value is out of the first threshold range, the input control switch is controlled to be turned off, the input of the voltage or the current of the sending end is stopped, and a notification message is sent to the sending end to inform the sending end to re-send the voltage or the current.

Obviously, in the embodiment of the present disclosure, the receiving end detects the collected voltage value or current value sent by the sending end firstly, and only when it is detected that the voltage value or the current value is in a tolerable range of the receiving end, the receiving end is allowed to receive the voltage value or the current value sent by the sending end by controlling the input control switch to be turned on. Thus, the safety of the voltage or the current received by the receiving end is ensured.

Wherein, the step that the received voltage or current is converted can specifically include that:

after performing a series of processing such as rectification, voltage dividing/current dividing, and alternating current-direct current conversion on the received voltage or current, the receiving end samples the voltage value of the processed voltage or the current value of the processed current, and detects whether the processed voltage value or current value is in the second pre-set threshold range; and when it is detected that the processed voltage value or current value is in the second pre-set threshold range, the pre-set output control switch is controlled to be turned on, the processed voltage or current is allowed to be outputted, specifically, to a battery in order to charge the battery.

The method further includes that:

when it is detected that the sampled voltage value or current value, which is processed above, is out of the second pre-set threshold range, the output control switch is controlled to be turned off, and the output of the processed voltage or current is prohibited; and the voltage or the current received by the receiving end is re-subjected to rectification, voltage dividing/current dividing, and alternating current-direct current conversion in order that the voltage value or the current value output by the receiving end can meet input requirements of the battery.

The first threshold range and the second threshold range can be flexibly set according to practical situations.

In the embodiment of the present disclosure, before the processed voltage or current is outputted to the battery, it is necessary to detect whether the voltage value or the current value is legal; if YES, the output control switch is controlled to be turned on, and the voltage or the current is outputted to the battery in order to charge the battery; and if NO, the output control switch is controlled to be turned off, and the output is prohibited. Thus, the safety of the battery is ensured, and the damage probability of the battery is reduced.

Figure 2:
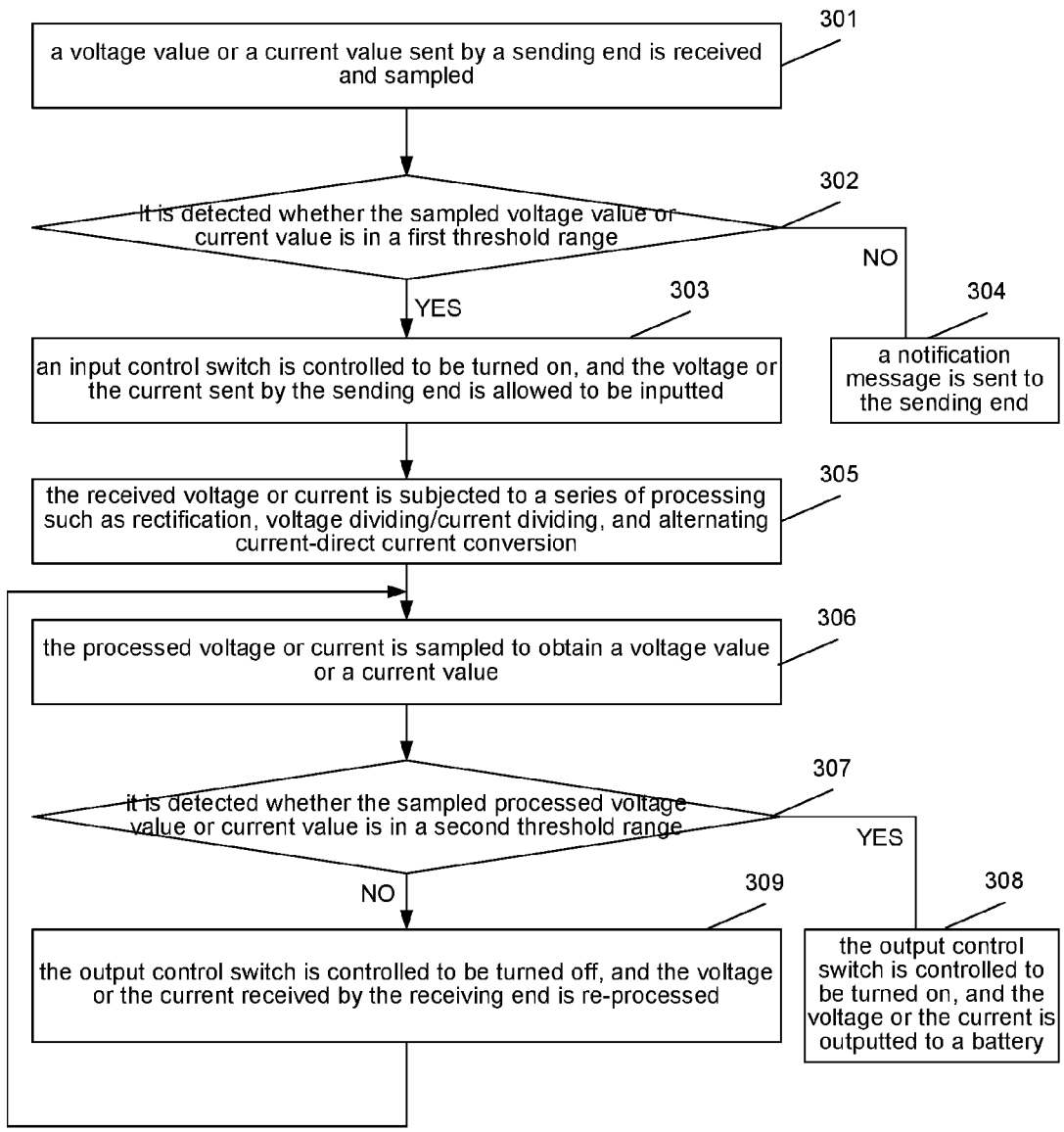
FIG. 2 is a specific implementation flowchart of a circuit protection method according to an embodiment of the present disclosure.

FIG. 2 is a specific implementation flowchart of a circuit protection method according to an embodiment of the present disclosure. The technical solutions of the embodiments of the present disclosure are further described below with reference to FIG. 2.

Step 301: A voltage value or a current value sent by a sending end is sampled.

Here, a receiving end receives a voltage or a current sent by the sending end via a wireless communication interface, and the voltage value or the current value is sampled via a sensor.

Step 302: It is detected whether the sampled voltage value or current value is in a first threshold range, if YES, Step 303 is executed, and if NO, Step 304 is executed.

Step 303: An input control switch is controlled to be turned on, the voltage or the current sent by the sending end is allowed to be inputted, and Step 305 is continuously executed.

Step 304: A notification message is sent to the sending end to inform the sending end to re-send the voltage or the current, after receiving the notification message, the sending end re-sends the voltage or the current to the receiving end, and Step 301 is continuously executed.

Step 305: The received voltage or current is subjected to a series of processing such as rectification, voltage dividing/current dividing, and alternating current-direct current conversion.

Here, the abovementioned processing is performed in order that the processed voltage or current more meets input requirements of a battery.

Step 306: The processed voltage or current is sampled to obtain a voltage value or a current value.

Step 307: It is detected whether the sampled processed voltage value or current value is in a second threshold range, if YES, Step 308 is executed, and if NO, Step 309 is executed.

Step 308: The output control switch is controlled to be turned on, the processed voltage or current is outputted to the battery, and a current flow is ended.

Step 309: The output control switch is controlled to be turned off, the voltage or the current received by the receiving end is re-subjected to rectification, voltage dividing/current dividing, alternating current-direct current conversion, and other processing, and Step 306 is continuously executed after the processing is completed.

An embodiment of the present disclosure also provides a computer storage medium, and a computer executable instruction is stored in the computer storage medium and is configured for the circuit protection method.

Figure 3:
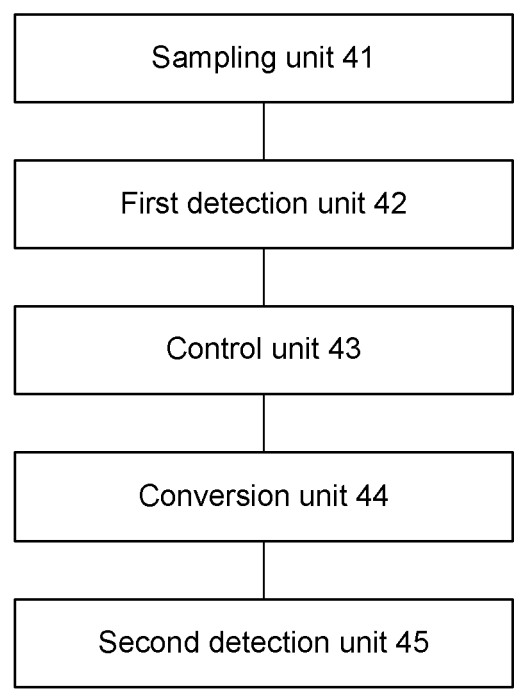
FIG. 3 is a composition structure diagram of a circuit protection apparatus according to an embodiment of the present disclosure.

On the basis of the circuit protection method, as shown in FIG. 3, an embodiment of the present disclosure also provides a circuit protection apparatus, which includes: a sampling unit 41, a first detection unit 42, a control unit 43, a conversion unit 44 and a second detection unit 45, wherein the sampling unit 41 is configured to sample a voltage value or a current value sent by a sending end;

the first detection unit 42 is configured to trigger the control unit 43 when it is detected that the voltage value or the current value is in a first pre-set threshold range;

the control unit 43 is configured to control a pre-set input control switch to be turned on to enable a voltage or a current of the sending end to be inputted;

the conversion unit 44 is configured to convert the received voltage or current;

the sampling unit 41 is further configured to sample a voltage value of the processed voltage or a current value of the processed current;

the second detection unit 45 is configured to trigger the control unit 43 when it is detected that the processed voltage value or current value is in a second pre-set threshold range; and the control unit 43 is further configured to control a pre-set output control switch to be turned on, and allow the processed voltage or current to be outputted.

Preferably, when the first detection unit 42 detects that the voltage value or the current value collected by the sampling unit 41 and sent by the sending end is out of the first threshold range, the control unit 43 is triggered; the control unit 43 controls the input control switch to be turned off, and the input of the voltage or the current of the sending end is stopped; and meanwhile, the control unit 43 is further configured to trigger the conversion unit 44 to send a notification message to the sending end so as to inform the sending end to re-send the voltage or the current.

The conversion unit 44 is configured to perform rectification, voltage dividing/current dividing, and alternating current-direct current conversion on the received voltage or current, and output the processed voltage or current; and here, the conversion unit 44 can output the processed voltage or current to a battery in order to charge the battery.

The sampling unit 41 is configured to sample the voltage or the current processed by the conversion unit 44 to obtain a processed voltage value or current value, and transmit the processed voltage value or current value to the second detection unit 45;

the second detection unit 45 is configured to trigger the control unit 43 when it is detected that the processed voltage value or current value is in a second pre-set threshold range; and the control unit 43 is further configured to control a pre-set output control switch to be turned on, and allow the conversion unit 44 to output the processed voltage or current.

The second detection unit 45 is further configured to trigger the control unit 43 when it is detected that the processed voltage value or current value is out of the second pre-set threshold range; and the control unit 43 is further configured to control the pre-set output control switch to be turned off, and prohibit the conversion unit 44 from outputting the processed voltage or current.

Here, when the control unit 43 controls the output control switch to be turned off, the conversion unit 44 re-performs rectification, voltage dividing/current dividing, alternating current-direct current conversion, and other processing on the voltage or the current received by the receiving end, and after the processing is completed, the sampling unit 41 is triggered; and the sampling unit 41 collects the processed voltage value of the voltage or the processed current value of the current, and transmits the collected voltage value or current value to the first detection unit 42, and the first detection unit 42 detects whether the voltage value or the current value is in the first threshold range.

In the embodiment of the present disclosure, the first detection unit 42 detects the voltage value or the current value sent by the sending end, only when it is detected that the voltage value or the current value is in a tolerable range of the receiving end, the control unit 43 controls the input control switch to be turned on, so that the voltage or the current sent by the sending end can be allowed to be received. Thus, the safety of the voltage or the current received by the receiving end is ensured. Before the conversion unit 44 outputs the processed voltage or current to the battery, it is necessary to detect whether the voltage value or the current value is legal by the second detection unit 45; if YES, the control unit 43 controls the output control switch to be turned on, and triggers the conversion unit 44 to output the legal voltage or current to the battery;

and when the second detection unit 42 detects that the processed voltage value or current value is illegal, the control unit 43 controls the output control switch to be turned off, so that the conversion unit 44 cannot output the illegal voltage or current to the battery. Thus, the safety of the battery is ensured, the damage probability of the battery is reduced, and the safety of wireless charging is also improved.

An embodiment of the present disclosure also provides a charging device, which includes the circuit protection apparatus.

Those skilled in the art should understand that realizing functions of each processing unit in the circuit protection apparatus shown in FIG. 3 can be understood with reference to relevant descriptions of the circuit protection method. Those skilled in the art should understand that functions of each processing unit in the circuit protection apparatus shown in FIG. 3 can be realized via a program running on a processor, and can also be realized via a specific logic circuit.

In practical application, the sampling unit 41, the first detection unit 42, the control unit 43, the conversion unit 44 and the second detection unit 45 can be each realized by a Central Processing Unit (CPU) or a Digital Signal Processor (DSP) or a Micro Processor Unit (MPU) or a Field Programmable Gate Array (FPGA) and the like; and the CPU, the DSP, the MPU and the FPGA can be built in the charging device, specifically a charging device for an electric vehicle, an electric bicycle or a terminal.

Those skilled in the art should understand that the embodiments of the present disclosure can provide a method, a system or a computer program product. Thus, forms of hardware embodiments, software embodiments or embodiments integrating software and hardware can be adopted in the present disclosure. Moreover, a form of the computer program product implemented on one or more computer available storage media (including, but not limited to, a disk memory, an optical memory and the like) containing computer available program codes can be adopted in the present disclosure.

The present disclosure is described with reference to flowcharts and/or block diagrams of the method, the equipment (system) and the computer program product according to the embodiments of the present disclosure. It should be understood that each flow and/or block in the flowcharts and/or the block diagrams and a combination of the flows and/or the blocks in the flowcharts and/or the block diagrams can be realized by computer program instructions. These computer program instructions can be provided for a general computer, a dedicated computer, an embedded processor or processors of other programmable data processing devices to generate a machine, so that an apparatus for realizing functions assigned in one or more flows of the flowcharts and/or one or more blocks of the block diagrams is generated via instructions executed by the computers or the processors of the other programmable data processing devices.

These computer program instructions can also be stored in a computer readable memory capable of guiding the computers or the other programmable data processing devices to work in a specific mode, so that a manufactured product including an instruction apparatus is generated via the instructions stored in the computer readable memory, and the instruction apparatus realizes the functions assigned in one or more flows of the flowcharts and/or one or more blocks of the block diagrams.

These computer program instructions can also be loaded to the computers or the other programmable data processing devices, so that processing realized by the computers is generated by executing a series of operation steps on the computers or the other programmable devices, and therefore the instructions executed on the computers or the other programmable devices provide a step of realizing the functions assigned in one or more flows of the flowcharts and/or one or more blocks of the block diagrams.

The above is only preferred embodiments of the present disclosure, and is not intended to limit the protection scope of the present disclosure.

INDUSTRIAL APPLICABILITY

The embodiments of the present disclosure provide the circuit protection method and apparatus, the charging device and the computer storage medium. The method includes that: the voltage or the current sent by the sending end is received, and the received voltage value or current value is sampled; when it is detected that the sampled voltage value or current value is in the first pre-set threshold range, the pre-set input control switch is controlled to be turned on, and the input of the voltage or the current of the sending end is received; the received voltage or current is converted, and the voltage value of the processed voltage or the current value of the processed current is sampled; and when it is detected that the processed voltage value or current value is in the second pre-set threshold range, the pre-set output control switch is controlled to be turned on, and the processed voltage or current is allowed to be outputted. By means of the technical solutions of the embodiments of the present disclosure, the detection of the illegal voltage value or current value can be realized, so that the illegal voltage value or current value cannot be inputted to the battery side. Thus, the damage probability of the battery is reduced, and the safety of wireless charging is improved.

What is claimed is:

1. A circuit protection method, comprising:
   receiving a voltage or a current sent by a sending end of a circuit protection apparatus, and sampling a voltage value of the received voltage or a current value of the received current;
   when it is detected that the sampled voltage value or the sampled current value is in a first pre-set threshold range, controlling a pre-set input control switch to be turned on, receiving an input of a voltage or a current of the sending end, processing the received voltage or the received current, and processing a voltage value of the processed received voltage or a current value of the processed received current; and
   when it is detected that the processed voltage value or the processed current value is in a second pre-set threshold range, controlling a pre-set output control switch to be turned on, and allowing the processed received voltage or the processed received current to be outputted.

2. The circuit protection method according to claim 1, further comprising:
   when it is detected that the sampled voltage value or the sampled current value is out of the first pre-set threshold range, controlling the pre-set input control switch to be turned off, stopping the input of the voltage or the current of the sending end, and sending a notification message to the sending end.

3. A non-transitory computer storage medium on which computer executable instructions are stored and configured to execute the circuit protection method according to claim 2.

4. The circuit protection method according to claim 1, wherein during the processing the received voltage or the received current, the method further comprises:
performing rectification, voltage dividing/current dividing, and alternating current- direct current conversion on the received voltage or the received current.

5. A non-transitory computer storage medium on which computer executable instructions are stored and configured to execute the circuit protection method according to claim 4.

6. The circuit protection method according to claim 1, further comprising:
when it is detected that the processed voltage value or the processed current value is out of the second pre-set threshold range, controlling the pre-set output control switch to be turned off, and prohibiting outputting of the processed received voltage or the processed received current.

7. A non-transitory computer storage medium on which computer executable instructions are stored and configured to execute the circuit protection method according to claim 6.

8. A non-transitory computer storage medium on which computer executable instructions are stored and configured to execute the circuit protection method according to claim 1.

9. A circuit protection apparatus, comprising: a sampling unit, a first detection unit, a control unit, a conversion unit and a second detection unit, wherein
the sampling unit is configured to sample a voltage value or a current value of a received voltage or a received current associated with a voltage or a current sent by a sending end of the circuit protection apparatus;
the first detection unit is configured to trigger the control unit when it is detected that the sampled voltage value or the sampled current value is in a first pre-set threshold range;
the control unit is configured to control a pre-set input control switch to be turned on to enable a voltage or a current of the sending end to be inputted;
the conversion unit is configured to process the received voltage or the received current;
the sampling unit is further configured to process a voltage value of the processed received voltage or a current value of the processed received current;
the second detection unit is configured to trigger the control unit when it is detected that the processed voltage value or the processed current value is in a second pre-set threshold range; and
the control unit is further configured to control a pre-set output control switch to be turned on, and allow the processed received voltage or the processed received current to be outputted.

10. The circuit protection apparatus according to claim 9, wherein
the first detection unit is further configured to trigger the control unit when it is detected that the sampled voltage value or the sampled current value is out of the first pre-set threshold range; and
the control unit is further configured to control the pre-set input control switch to be turned off, stop the input of the voltage or the current of the sending end, and send a notification message to the sending end.

11. A charging device, comprising the circuit protection apparatus according to claim 10.

12. The circuit protection apparatus according to claim 9, wherein the conversion unit is further configured to perform rectification, voltage dividing/current dividing, and alternating current-direct current conversion on the received voltage or the received current.

13. The circuit protection apparatus according to claim 12, wherein
the second detection unit is further configured to trigger the control unit when it is detected that the processed voltage value or the processed current value is out of the second pre-set threshold range; and
the control unit is further configured to control the pre-set output control switch to be turned off, and prohibit outputting of the processed received voltage or the processed received current.

14. A charging device, comprising the circuit protection apparatus according to claim 13.

15. A charging device, comprising the circuit protection apparatus according to claim 12.

16. A charging device, comprising the circuit protection apparatus according to claim 9.

* * * * *